United States Patent [19]
Sandgren

[11] Patent Number: 5,988,105
[45] Date of Patent: Nov. 23, 1999

[54] CLAW FOR A MILKING MACHINE

[75] Inventor: Karl-Olof Sandgren, Grödinge, Sweden

[73] Assignee: Alfa Laval Agri AB, Tumba, Sweden

[21] Appl. No.: 09/117,674

[22] PCT Filed: Feb. 4, 1997

[86] PCT No.: PCT/SE97/00168

§ 371 Date: Aug. 4, 1998

§ 102(e) Date: Aug. 4, 1998

[87] PCT Pub. No.: WO97/27738

PCT Pub. Date: Aug. 7, 1997

[30] Foreign Application Priority Data

Feb. 2, 1996 [SE] Sweden .................................. 9600412

[51] Int. Cl.[6] ....................................................... A01J 5/04
[52] U.S. Cl. ........................................................ 119/14.54
[58] Field of Search ............................ 119/14.37, 14.54, 119/14.55

[56] References Cited

U.S. PATENT DOCUMENTS

| | | | |
|---|---|---|---|
| 2,775,225 | 12/1956 | Brown et al. | 119/14.54 |
| 3,029,787 | 4/1962 | Lamberson | 119/14.54 |
| 3,094,099 | 6/1963 | Bertao | 119/14.54 |
| 3,139,856 | 7/1964 | Lippke | 119/14.54 |
| 3,150,637 | 9/1964 | Fosnes | 119/14.54 |
| 4,136,639 | 1/1979 | Noorlander | 119/14.55 |
| 4,537,152 | 8/1985 | Thompson | 119/14.54 |
| 5,076,211 | 12/1991 | Tonelli | 119/14.55 |
| 5,291,853 | 3/1994 | Steingraber et al. | 119/14.54 |
| 5,586,518 | 12/1996 | Carrano | 119/14.54 |

FOREIGN PATENT DOCUMENTS

| | | |
|---|---|---|
| 74799 | 10/1952 | Denmark . |
| 418260 | 1/1995 | European Pat. Off. . |
| 977930 | 4/1951 | France . |
| 104989 | 3/1942 | Sweden . |
| 133288 | 10/1951 | Sweden . |
| 212649 | 3/1967 | Sweden . |
| 449154 | 4/1987 | Sweden . |
| WO9322901 | 11/1993 | WIPO . |

*Primary Examiner*—Robert P. Swiatek
*Assistant Examiner*—Elizabeth Shaw
*Attorney, Agent, or Firm*—Hovey, Williams, Timmons & Collins

[57] ABSTRACT

A claw for a milking machine comprises a housing (1) having a first portion (2) and a second portion (3). On the second portion (3), there are provided inlet members (8, 9) which are intended to connect the inner space of the housing (1) to teatcup of the milking machine. On the first portion (2), there is provided an outlet member (6), which via a conduit member is intended to connect the inner space of the housing (1) to a milk collecting member of the milking machine and a distributing member having at least one inlet pipe directed in essentially the same direction as the outlet member. In order to minimize the torsional forces, which via the conduit member act on the claw when it is attached to an animal to be milked, the first portion (2) is movable in relation to the second portion (3).

19 Claims, 6 Drawing Sheets

CLAW FOR A MILKING MACHINE

BACKGROUND OF THE INVENTION

1. Field of the Invention

The present invention refers to a claw for a milking machine, comprising a housing, having a first portion and a second portion, at least one inlet member, adapted to connect the inner space of the housing to a teatcup of the milking machine, an outlet member, adapted to connect the inner space of the housing to a milk collecting member of the milking machine via a conduit member, and a distributing member comprising at least one inlet pipe arranged to be connected to said milking machine and at least one outlet pipe arranged to be connected to said teatcup, said outlet member being provided on the first portion and said inlet member being provided on the second portion.

2. Description of the Prior Art

One milking claw, known by EP-B-418 260, comprises a housing having a center axis, which in an operating position of the claw extends vertically, and an upper and a lower portion. The inner space of the housing forms a chamber for receiving milk via four inlet members connected to a respective teatcup of the milking machine. An outlet member, which via a milk conduit is connected to a milk collecting unit of the milking machine, extends from said chamber. Both the outlet member and the inlet members are fixedly provided on the upper portion of the housing and are thus not movable in relation to each other. The outlet member comprises an outlet nipple extending radially outwardly perpendicularly from the center axis of the housing. The inlet members comprise four inlet openings provided in pairs so that one of the pairs is intended to be connected to teatcups being applied to the front teats of the cow and the other pair is intended for teatcups being applied to the rear teats of the cow. The inlet members are provided on a conical surface of the upper portion at the same height with respect to the vertical center axis.

For such a claw the ideal operating position during milking of a cow is provided by an imaginary longitudinal center line between the inlet members for the rear teats and between the inlet members for the front teats as well as the longitudinal axis of the outlet nipple coincide, when seen from above, with a center line of the cow, which extends in the middle between the front teats and in the middle between the rear teats. However, this ideal operating position is never obtained in practice since the milk conduit connected to the outlet nipple and to a milk collecting unit located laterally of the cow, will apply a force tending to rotate the claw. Since the milk conduit is a relatively heavy and rigid transport hose, which in addition may be connected to one or several pulse conduits, the torsional forces acting on the claw in a horizontal direction as well as a vertical direction are significant. Such a rotation of the claw influences the position of the teatcups at the teats and may result in such a twisting or rotation of the teats that the teat cistern is constricted and that the extraction of milk from the udder is obstructed or even no longer possible.

In order to overcome this problem it has been suggested to introduce devices, for instance a so called service arm, keeping the claw and/or the milk conduit in a proper position. Beside the fact that such auxiliary equipment makes the milking plant more expensive, such devices are hindering and require additional work for attachment.

SE-B-449 154 discloses a milking machine having a claw comprising a housing with an upper portion and a lower portion. Four inlet nipples are provided on the upper portion and connect the inner space of the housing to a respective teatcup of the milking machine via conduits. Four outlet nipples are provided on the lower portion and connect the inner space of the housing to a milking collecting member of the milking machine via conduits. In the inner space of the housing there are four intermediate walls dividing the inner space of the housing in four chambers having an equal size. One inlet nipple and one outlet nipple is connected to each chamber. The upper portion may be rotated in fixed 90° steps in relation to the lower portion so that each inlet nipple may be displaced to be opposite another outlet nipple.

DK-C-74799 discloses a claw having an upper portion in which four inlet nipples are provided and a lower portion comprising an outlet nipple. Furthermore, a distributing member is provided on the upper portion and comprises two inlet pipes to be connected to a milking machine and four outlet pipes arranged to be connected to a respective teatcup. Although the lower portion, the upper portion and the distributing member are rotatable in relation to each other, this known claw does not disclose the possibility of providing the inlet pipes of the distributing member in such a manner that they always will be directed in the same direction as the outlet nipple of the claw.

SE-C-133 288 discloses a claw having a lower portion with an outlet nipple provided to extend vertically downwardly and an upper portion having four inlet nipples.

SE-C-104 989 discloses a claw having individually movable inlet nipples. These are provided in an upper portion provided on a lower portion from which the outlet nipple of the claw extends.

SUMMARY OF THE INVENTION

The object of the present invention is to overcome the problems mentioned above and provide a claw having such a configuration that twisting or deformation of the teats of an animal is avoided during milking of the animal.

This object is obtained by the claw initially defined and characterized in that the distributing member is provided on the first portion in such a manner that said inlet pipe is directed in essentially the same direction as the outlet member and that the first portion is movable in relation to the second portion to such a position that essentially no torsional force will be applied to the claw via the conduit member when the claw is attached to an animal to be milked. By means of such a claw the outlet member may be displaced in relation to the inlet members in such a manner that the outlet member is directed towards the milk collecting member of the milking machine i.e. the conduit member provided between the outlet member and the milking machine will not apply any torsional force to the claw, i.e. any force tending to rotate the claw, but this may maintain an optimal operating position in relation to the teats of the animal. By such an embodiment, it is also possible to compensate for the torsional force applied to the claw by a pulse conduit.

According to an embodiment of the invention the first portion is rotatable in relation to the second portion. By such a rotating movement, the invention may be realised in a constructively simple manner. Thereby, the housing may advantageously have a center axis, which in an operating position of the claw extends essentially vertically and the first portion be rotatable about the center axis in relation to the second portion. Since the first portion is continuously rotatable in relation to the second portion, it is ensured that the optimal operating position may be obtained.

According to a further embodiment, the second portion is located beneath the first portion when the claw is in the operating position. This means that the outlet member will be located above the inlet members, i.e. closer to the animal. Since the claw due to the weight of the milk conduit connected to the outlet member tends to rotate the claw about a point located in the area of the conduits connecting the inlet members to the teatcups, this configuration leads to a shorter lever than if the outlet member would have been located below the inlet members.

According to a further embodiment, the claw comprises a locking member by means of which the first portion is lockable in said position in relation to the second member. Thereby, the direction of the inlet member may be adjusted in advance and locked in this position adapted to a particular milking plant. Thereby, the first portion may have a radially outwardly directed first flange and the second portion a radially outwardly directed second flange and the locking member be arranged to compress the first and second flanges against each other. In order to accomplish such a locking function, the locking member may comprise a profiled clamp having two opposing flanges which engage the first and second flanges therebetween.

In order to prevent milk leakage a sealing member may be arranged to seal the inner space of the housing at the transition between the first portion and the second portion. Advantageously, the sealing member may comprise a sealing ring provided between the first and second flanges.

According to a further embodiment, the outlet member comprises an outlet nipple extending laterally outwardly from the housing of the claw, the conduit member comprises at least one pulse conduit arranged to transfer a pulsating vacuum from the milking machine to the distributing member and that said outlet pipe is adapted to be connected to a pulsating chamber of a teatcup via an outlet conduit. Because of the articulated distributing member the output conduits connected to the pulsation chamber of the teatcups will be naturally and slightly curved and will not demonstrate any sharp bendings or folds.

According to a further embodiment, the claw comprises a suction pipe provided in the inner space of the housing and extending downwardly from the inlet member towards the bottom of the housing. Furthermore, radially projecting wing-like members are provided on the suction pipe in such a manner that below each inlet member a separate space is delimited. By such wing-like members, it is prevented that milk from an infected teat reaches another teat and infects the latter.

According to a further embodiment, the housing has a center axis, which in an operating position of the claw extends essentially vertically, and four inlet members, each connected to a respective teatcup, are provided in pairs on the second portion in such a manner, that a first pair intended for two front teats of an animal to be milked extends to a higher position with respect to the vertical center axis than a second pair intended for the rear teats of the animal. In normal cases, the front teats of a cow are located at a higher position than the rear teats. By this embodiment, it is possible to compensate for such a level difference between the teats so that the center axis of the claw may extend vertically when the claw is attached to a cow during milking. Furthermore, the second portion has a dome-like shape, at least in the region where the inlet members are provided and the first pair of the inlet members is provided at a higher location on the dome-like region than the second pair. Furthermore, the first pair of inlet members may extend obliquely upwardly and forwardly by a first angle in relation to a horizontal plane to which the center axis forms the normal, and the second pair extends obliquely upwardly and rearwardly by a second angle in relation to the horizontal plane. In order to compensate for the fact that the front teats of the cow are located at a higher position than the rear teats, the first angle may be greater than the second angle.

Furthermore, the first pair of the inlet members may have a longer distance between the inlet members than the second pair. By such an embodiment one may take into account the fact that the front teats of a cow normally have a greater mutual distance than the rear teats.

The inlet members may according to a further embodiment comprise a passage extending through the wall of the housing and a portion of the wall of the housing through which the passage extends may have essentially plane parallel surfaces. Alternatively, each inlet member may comprise a tubular element extending from the housing.

BRIEF DESCRIPTION OF THE DRAWINGS

The present invention will now be explained more closely by means of different embodiments, shown by way of example, and with reference to the drawings attached.

DETAILED DESCRIPTION OF DIFFERENT EMBODIMENTS

With reference to FIG. 1 to 7, a claw according to the invention is disclosed, which comprises a housing 1. The housing 1 comprises a first upper portion 2, a second intermediate portion 3 and a third lower portion 4. Through the housing 1, a center axis 5 extends essentially vertically when the claw is in an optimal operating position. On the upper portion 2 an outlet member is provided, which in the example disclosed comprises an outlet nipple 6 extending essentially radially outwardly from the housing 1 and the upper portion 2 with respect to the center axis 5, i.e. the outlet nipple 6 has a longitudinal centre axis 7 being perpendicular to the center axis 5. On the intermediate portion 3 four inlet members 8, 9 and 8', 9', respectively, are provided.

Components which in the different embodiments have corresponding functions have been given the same reference signs.

Figure 1:
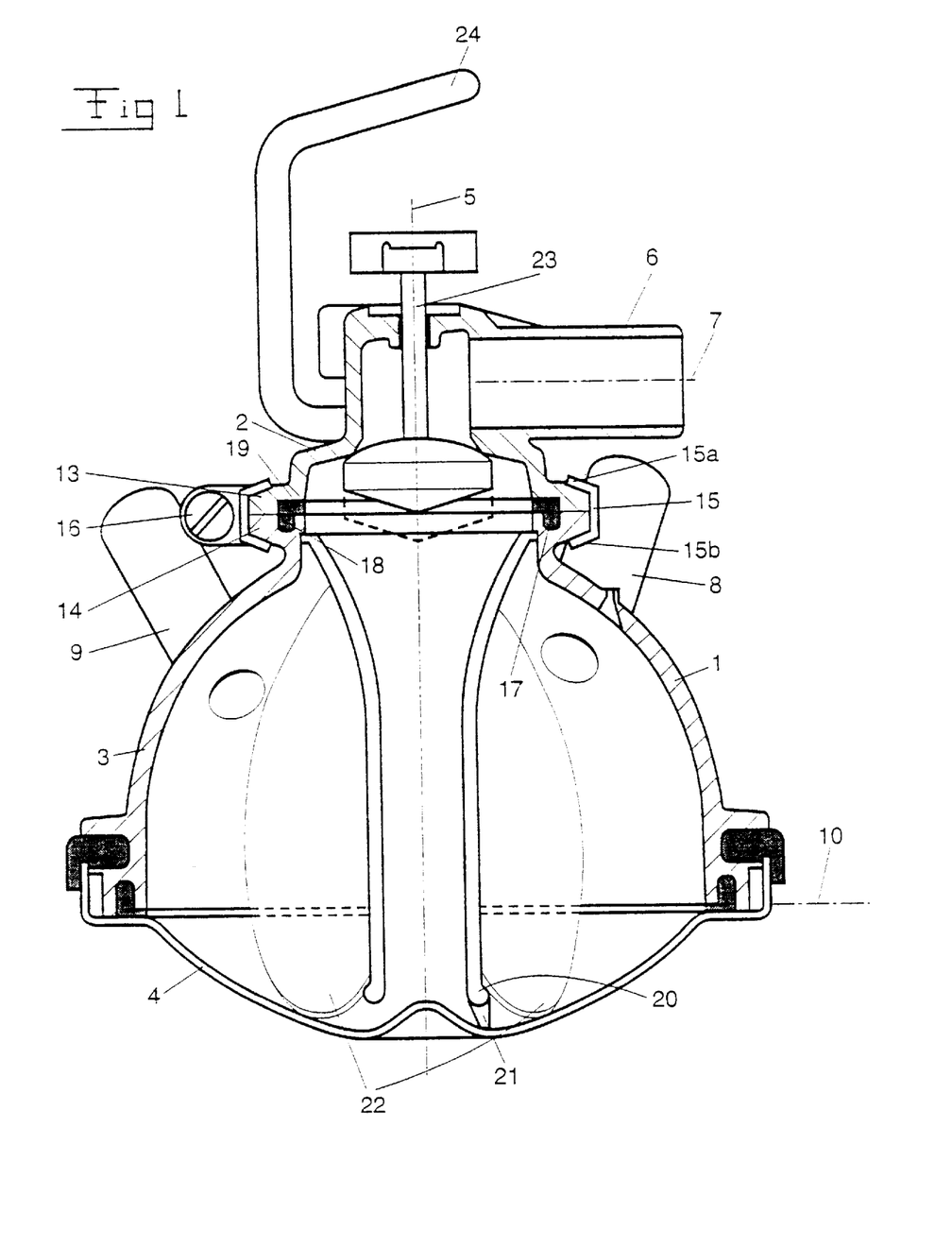
FIG. 1 discloses a vertical section through a claw according to a first embodiment of the invention.
Figure 2:
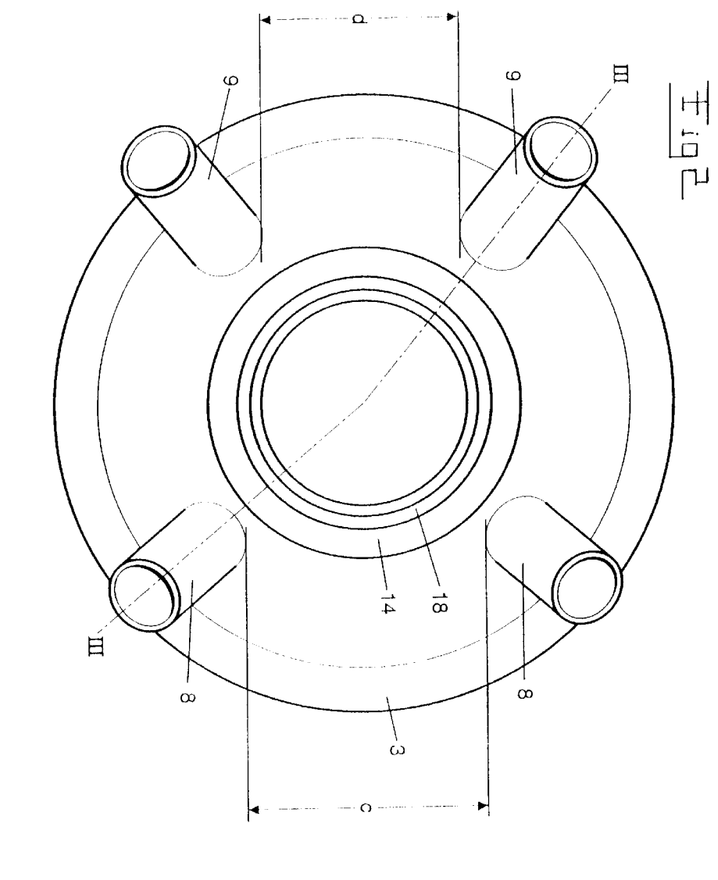
FIG. 2 discloses a view from above of a portion of the claw according to FIG. 1.
Figure 3:
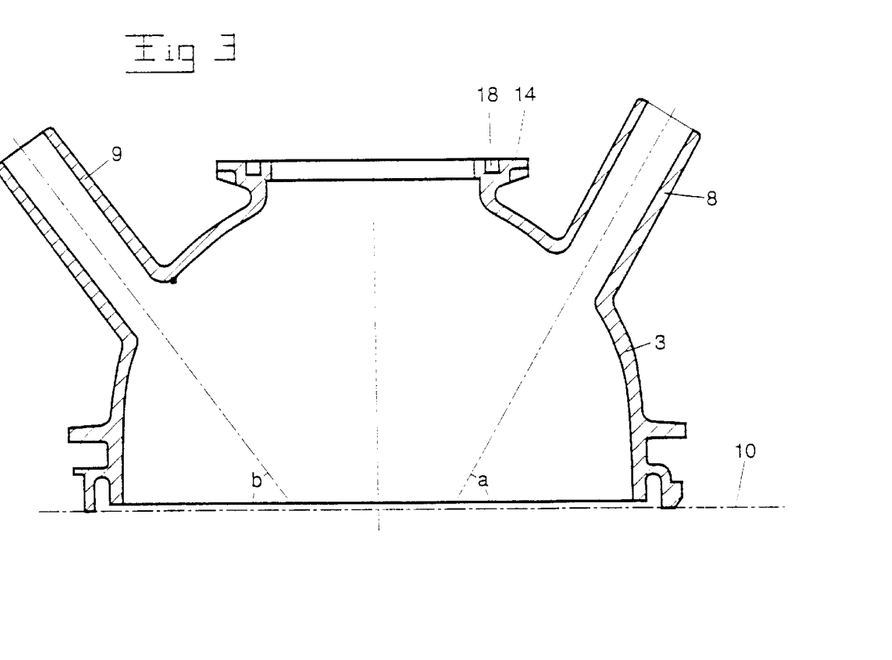
FIG. 3 discloses a section along the line III—III in FIG. 2.

According to the embodiments disclosed in FIG. 1–3 the inlet members 8, 9 comprise four tubular elements extending obliquely upwardly and configured as inlet nipples. Each inlet nipple 8, 9 is intended to be connected to a short milk conduit (not disclosed) which in turn is connected to a teatcup (not disclosed). The inlet nipples 8 are intended for the teatcups to be connected to two front teats of a cow to be milked and the inlet nipples 9 are intended for the teatcups to be connected to the rear teats of the cow. As is disclosed in FIG. 3, the front inlet nipples 8 extend to a higher position with respect to a horizontal plane 10 to which the center axis 5 forms the normal than the rear inlet nipples 9. Since the inlet nipples 8 and 9 have an equal length, this configuration has been accomplished by providing the front inlet nipples 8 at a higher location than the rear inlet nipples 9 on the intermediate portion 3. The front inlet nipples 8 extend in a longitudinal direction obliquely forwardly and outwardly by an angle a of inclination in relation to the horizontal plane 10 and the rear outlet nipples 9 extend in a longitudinal direction obliquely rearwardly and outwardly by a angle b of inclination in relation to the horizontal plane 10. It should be noted that the angles a and b define the inclination of the longitudinal directions of the inlet members 8, 9 in the two planes being radial with respect to the center axis 5 and coinciding with the section III—III in FIG. 2. As is disclosed in FIG. 3, the angle a is greater than the angle b. Furthermore, as is disclosed in FIG. 2, the mutual distance c between the front inlet nipples 8 is greater than the mutual distance d between the rear inlet nipples 9.

Figure 5:
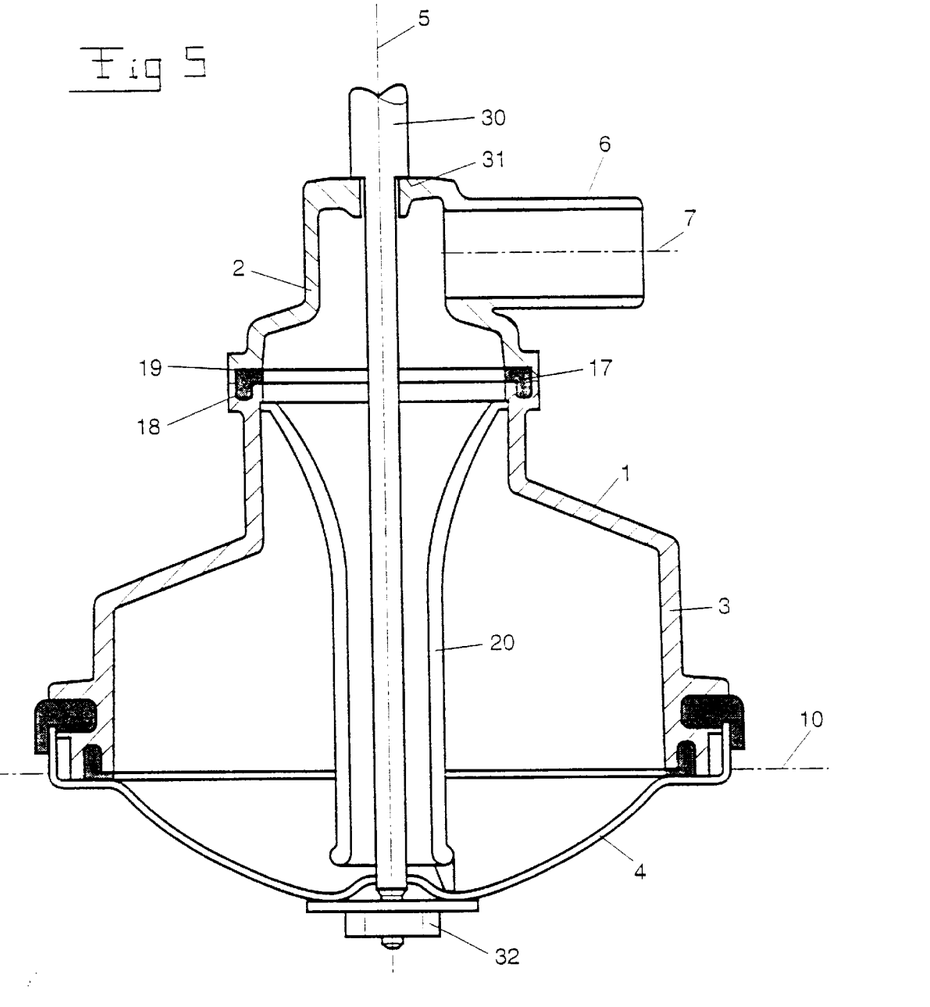
FIG. 5 discloses a vertical section through a claw according to a second embodiment of the invention.
Figure 6:
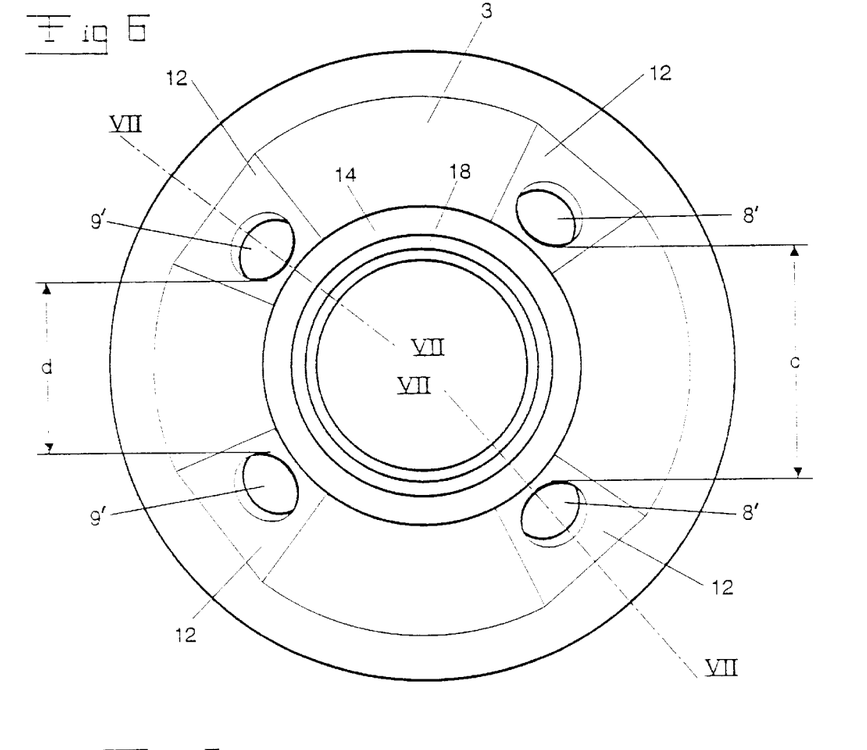
FIG. 6 discloses a view from above of a portion of the claw according to the second embodiment.
Figure 7:
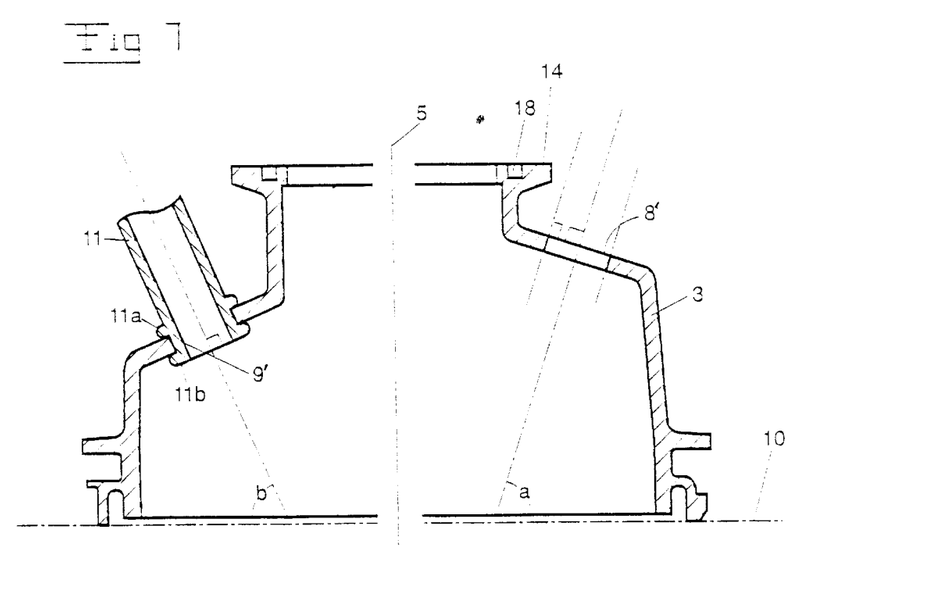
FIG. 7 discloses a section along the line VII—VII in FIG. 6.

According to the embodiment disclosed in FIG. 5–7, each inlet member 8', 9' comprises an inlet passage which extends through the wall of the housing 1 and is adapted to receive a short milk conduit 11 fixed to the wall of the housing 1 by means of two ribs 11a, 11b, provided on the outer surface of the milk conduit 11 and extending therearound, see FIG. 7. Each such short milk conduit 11, which practically frequently are a prolongation of a teatcup liner, is a standard product which preferably is manufactured in one single length. In such a manner, the manufacturing of the short milk conduits/teatcup liners is facilitated and exchange thereof is simplified since it is not necessary to take into account the positioning of an individual teatcup liner with respect to a particular inlet passage. The housing I disclosed in FIG. 5–7 forms a wall by means of which the inner space of the housing 1 is delimited. This wall has a wall portion 12 around each passage 8', 9', i.e. the passage 8', 9' extends through said portion. This wall portion 12 is essentially plane parallel, i.e. the outer surface of the portion 12 is essentially parallel with the inner surface of the portion 12, and these surfaces are essentially plane. This means that the ribs 11a and 11b may sealingly close the passage, so that no air may penetrate the inner space of the housing 1, between the edge side of the passage 8', 9' and the milk conduit 11 introduced in the passage 8', 9'. It should also be noted that each passage 8', 9' extends in a direction essentially perpendicular through the wall portion 12, see FIG. 7, i.e. the edge side of the passage 8', 9' is essentially perpendicular to the outer surface and the inner surface of the wall portion 12. Thereby, the sealing capacity of the milk conduit 11 against the housing around the passage 8', 9' is further improved. In the areas between the wall portions 12, the housing 1 may have an arbitrary shape. In a similar way as in the embodiment according to FIG. 1–3, the four inlet members 8', 9' are provided in pairs in such a manner that the first pair 8', intended for two front teats of a cow to be milked, is located at a higher position with respect to the vertical center axis 5 than a second pair 9', intended for the rear teats of the cow, see FIG. 7. Furthermore, the four inlet members 8', 9' are arranged in such a manner that the passage of the actual inlet member extends in said direction through the wall of the housing 1 essentially straight towards the teat to which the actual inlet member 8', 9' is intended to be connected. Furthermore, said direction of each passage 8', 9' coincides with the normal to the portion of the wall of the housing 1, through which the passage 8', 9' extends, i.e. the plane parallel wall portion 12. This means that the wall portions 12 comprising the essentially plane parallel surfaces are not parallel to but are inclined in relation to the horizontal plane 10 and that the normals of the wall portions 12, i.e. said directions, of the first pair 8' of the passages, which are intended for the two front teats of the cow to be milked, extend obliquely forwardly and outwardly by a first angle a in relation to the horizontal plane 10 and that the normals, i.e. said directions, of the second pair 9', which is intended for the rear teats of the cow, extend obliquely rearwardly and outwardly by a second angle b in relation to the horizontal plane 10. It should be noted that the angles a and b define the inclination of the directions of the inlet member 8', 9' in the two planes which coincide with the sections VII—VII in FIG. 6. The angles a and b in FIG. 7 are defined by the height difference between the front and the rear teats of the cow, i.e. the fact that the rear teats normally are located at a lower position, by the distance between the front and the rear teats and by the mutual distance between the front teats and the mutual distance between the rear teats. Moreover, as is disclosed in FIG. 6, the mutual distance c between the front inlet members 8' is longer than the corresponding distance d between the rear inlet members 9'.

The upper portion 2 comprises a radially projecting flange 13 and the intermediate portion 3 comprises a corresponding radially projecting flange 14. The upper portion 2 and the intermediate portion 3 are kept together by means of a locking member, which in the example disclosed in FIG. 1–3 is formed by a profiled clamp 15. The profiled clamp 15 comprises two opposing obliquely upwardly and obliquely downwardly, respectively, directed flanges 15a and 15b which abut corresponding oblique surfaces of the radially projecting flanges 13 and 14, respectively. When the profiled clamp 15 is compressed by means of a screw member 16 disclosed in the example, the flanges 13 and 14 will be pressed against each other. In order to seal the inner space of the housing 1, a sealing ring 17 may be provided between the radially projecting flanges 13 and 14. In the example disclosed the radially projecting flange 14 comprises a recess 18 extending therearound, in which the sealing ring 17 is provided, and the radially projecting flange comprises a recess 19 having a diameter corresponding to the outer diameter of the sealing ring 17.

Furthermore, in the inner space of the housing 1 a suction pipe 20 is provided. This extends in the direction of the center axis 5 and is by means of support members 21 provided at a distance from a bottom of the housing 1. In the upper end the suction pipe 20 abuts the inner wall of the intermediate portion 3 and in this way the suction pipe 20 is fixedly provided in the inner space of the housing 1. Furthermore, the suction pipe 20 may, as is disclosed in FIG. 1, comprise four wings 22 which extend in a respective radial plane and are provided by a mutual angle distance of about 90° and in such a manner that a wing 22 extends radially outwardly between each of the inlet members 8, 9.

As is disclosed in FIG. 1 the claw may comprise a closing valve 23 provided in the upper portion 2 and displaceable along the center axis 5. The closing valve 23 is intended to close off automatically the outlet member as the claw is attached to an animal. Furthermore, the claw may comprise a suspension member 24, see FIG. 1.

Figure 4:
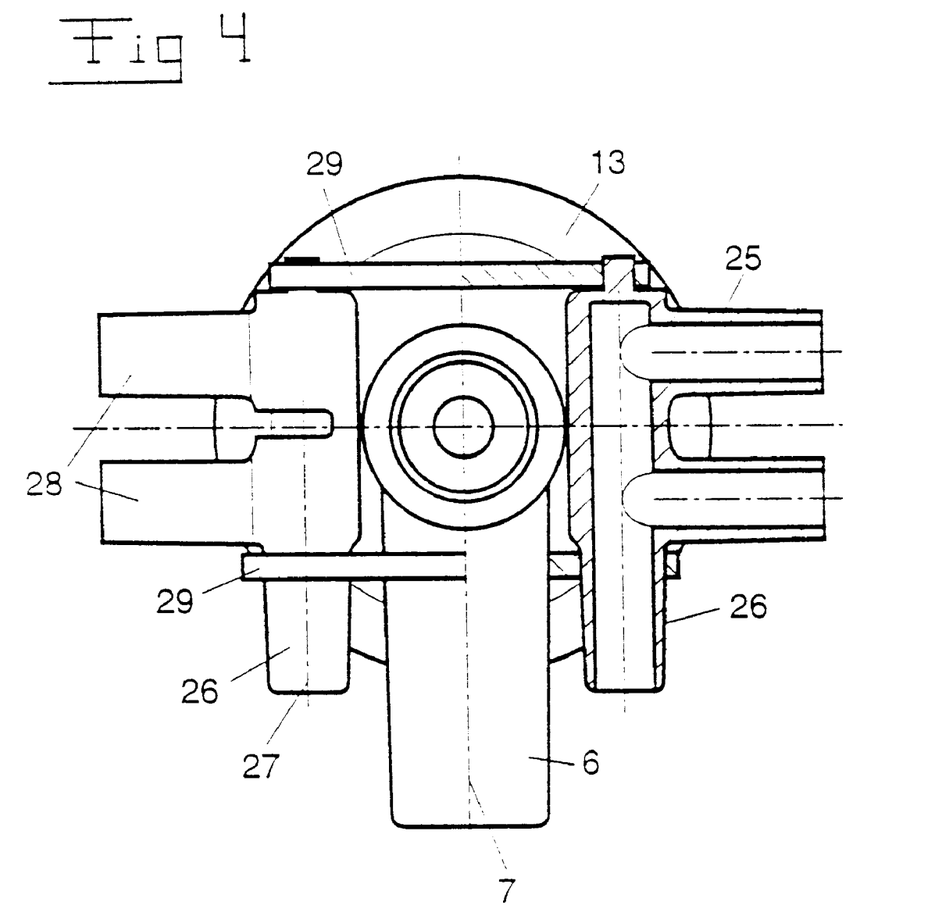
FIG. 4 discloses a partly sectional view from above of another portion of the claw according to FIG. 1.

As is disclosed in FIG. 4, the claw comprises two distributing members 25 provided on the upper portion 2. Each distributing member 25 comprises an inlet pipe 26 having a respective longitudinal axis 27. The axes 27 are provided in parallel to the longitudinal axis 7 of the outlet nipple 6. Furthermore, each distributing member 25 comprises two inlet pipes 28 which, via a respective short pulse conduit (not disclosed) are connected to a pulsating chamber of a teatcup (not disclosed). Each distributing member 25 is attached to two support members 29 provided on the upper portion 2 in such a manner that the distributing members 25 are rotatable about their respective longitudinal axis 27.

The claw disclosed in FIG. 5 comprises no profiled clamp but is kept together by means of a bolt 30 extending along the center axis 5 through the whole claw. The bolt 30 comprises a step 31 abutting the upper portion 2 and in its lower end a thread on which a nut 32 is screwed. By tightening the nut 32, the three portions 2,3 and 4 are compressed against each other and the upper portion 3 may be locked in an arbitrary rotational position in relation to the intermediate portion 3. The bolt 30 may in its upper end be provided with a suspension member not disclosed.

It should also be noted that the claw does not need to have a circular shape seen from above, but may for example be a quadrangle tapering in a rearward direction, i.e. the front edge side is longer than the rear edge side. Such a shape is adapted to the positions in which the inlet members 8, 9 are located.

By a claw, which is adapted to the position of the teats of the animal to be milked, i.e. which has a pronounced front and rear end, it may be advantageous with four essentially fixed rotational positions for the upper portion 2, comprising the outlet nipple 6, in relation to the intermediate portion 3. These essentially fixed or marked rotational positions are located at a distance of about 90° from each other and correspond to the case that the milking machine is located essentially in front of, laterally of or behind the animal to be milked.

During use the claw 1 disclosed functions in the following way, see FIG. 1–9. Milk from the teatcups not disclosed is sucked via the inlet members 8, 9 and 8', 9', respectively, into the inner space of the housing 1. From there, the milk is sucked further via the suction pipe 20 out through the outlet nipple 6 which via a milk conduit 33 may be connected to a collecting container of a milking machine 34. The milking conduit 33 extends in parallel to two pulse conduits (not disclosed) connecting the inlet pipe 26 of the distributing members 25 to a vacuum pump of the milking machine (not disclosed). The milk conduit 33 and the pulse conduits may be connected to a conduit package. This conduit package is necessarily relatively rigid and heavy and will therefore apply significant torsional forces to the claw. By the claw disclosed, these torsional forces may be minimized by a rotation of the upper portion 2 about the center axis 5 in relation to the intermediate portion 3. Preferably, the upper portion 2 is rotated so much that the outlet nipple 6 will be directed essentially in the direction in which the milk conduit 33 and the pulse conduits extend. This direction is defined by the disposition in a milking stall in which the claw is used. When this best direction has been chosen the upper portion 2 is locked in relation to the intermediate portion 3 by tightening the nut 32 or the screw member 16 thereby compressing the radially projecting flanges 13 and 14 of the profiled clamp 15 against each other.

Figure 8:
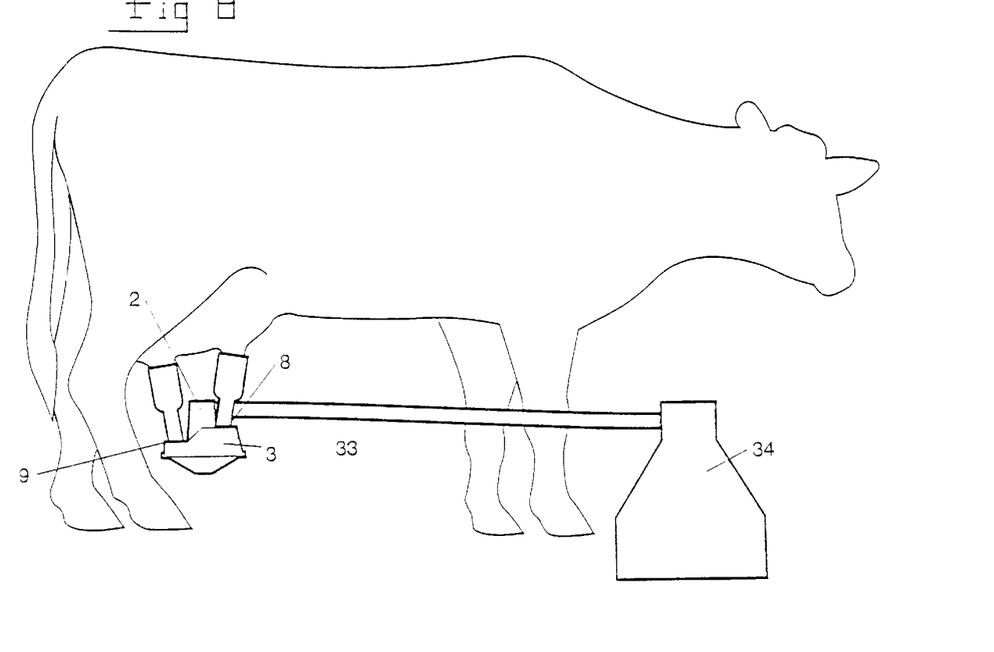
FIG. 8 discloses a side-view of an animal during milking by a claw according to the invention.
Figure 9:
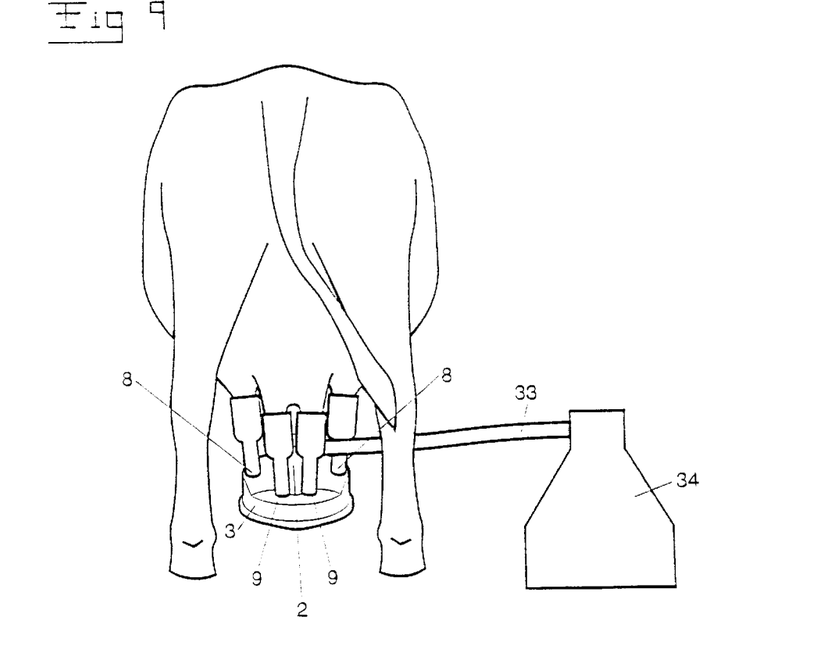
FIG. 9 discloses a view from behind of an animal during milking by a claw according to the invention.

As is disclosed in FIG. 8 and 9 the claw will, due to the configuration according to the invention, be suspended horizontally, i.e. the center axis 5 will be vertical. Because of this, the pulling force acting downwardly at each teat will be essentially equal and thereby a uniform and equal milk extraction from each teat is ensured. Furthermore, the horizontal position means that the milk collected in the claw may be transported away therefrom in an uniform and continuous flow, thereby reducing the risk for so called impact and backflow.

The invention is not limited to the embodiments disclosed but may be varied within the scope of the features defined in the following claims. For instance, the outlet nipple 6 and the upper portion 2 may also be rotated in a vertical direction in relation to the intermediate portion 3 in order to compensate for a possible height difference between the claw and the milking machine or due to the downwardly rotating force applied to the claw by the milk conduit due to its weight.

I claim:

1. A claw for a milking machine having at least one teatcup, comprising:

a housing having a first portion and a second portion and defining therein an inner space;

at least one inlet member adapted to connect the inner space of the housing to a teatcup of the milking machine;

an outlet member adapted to connect the inner space of the housing to a milk collecting member of the milking machine via a conduit member; and a distributing member comprising at least one inlet pipe arranged to be connected to said milking machine and at least one outlet pipe arranged to be connected to said teatcup, the outlet member being provided on the first portion, and the inlet member being provided on the second portion, wherein the distributing member is provided on the first portion in such a manner that said inlet pipe is directed in essentially the same direction as the outlet member, and the first portion is rotatable in relation to the second portion to such a position that essentially no torsional force will be applied to the claw via the conduit member when the claw is attached to an animal to be milked.

2. A claw according to claim 1, wherein the housing has a center axis, which in an operating position of the claw extends essentially vertically, and the first portion is rotatable about the center axis in relation to the second portion.

3. A claw according to claim 1, wherein the first portion is continuously rotatable in relation to the second portion.

4. A claw according to claim 1, wherein the second portion is located beneath the first portion when the claw is in the operating position.

5. A claw according to claim 1, including a locking member by means of which the first portion is lockable in said position in relation to the second portion.

6. A claw accordingly to claim 5, wherein the first portion has a radially outwardly directed first flange and the second portion a radially outwardly directed second flange and that the locking member is arranged to compress the first and second flanges against each other.

7. A claw according to claim 6, wherein the locking member comprises a profiled clamp having two opposing flanges which engage the first and second flanges therebetween.

8. A claw according to claim 6, wherein the sealing member comprises a sealing ring provided between the first and second flanges.

9. A claw according to claim 1, including a sealing member arranged to seal the inner space of the housing at the transition between the first portion and the second portion.

10. A claw according to claim 1, wherein the outlet member comprises an outlet nipple extending laterally outwardly from the housing of the claw, the conduit member comprises at least one pulse conduit arranged to transfer a pulsating vacuum from the milking machine to the distributing member and said outlet pipe is adapted to be connected to a pulsating chamber of a teatcup via an outlet conduit.

11. A claw according to claim 1, wherein the housing comprises a third portion forming the bottom of the housing and the second portion is provided between the first and third portions.

12. A claw according to claim 1, including a suction pipe provided in the inner space of the housing and extending downwardly from the outlet member towards the bottom of the housing.

13. A claw according to claim 12, wherein radially projecting wing-like members are provided on the suction pipe in such manner that below each inlet member a separate space is delimited.

14. A claw according to claim 1, wherein the housing has a center axis, which in an operating position of the claw extends essentially vertically, and that four inlet members each connected to a respective teatcup are provided in pairs on the second portion in such a manner that a first pair intended for two front teats of an animal to be milked extends to a higher position with respect to the vertical center axis than a second pair intended for the rear teats of the animal.

15. A claw according to claim 14, wherein the second portion has a dome-like shape at least in the region where the inlet members are provided, and the first pair of the inlet members are provided at a higher location at the dome-like region than the second pair.

16. A claw according to claim 14, wherein the first pair of the inlet members extends obliquely upwardly and forwardly by a first angle in relation to a horizontal plane to which the center axis forms the normal, and the second pair extends obliquely upwardly and rearwardly by a second angle in relation to the horizontal plane and that the first angle is greater than the second angle.

17. A claw according to claim 14, wherein the first pair of the inlet members has a longer distance between the inlet members than the second pair of the inlet members.

18. A claw according to claim 1, wherein each inlet member comprises a passage extending through the wall of the housing and that a portion of the wall of the housing through which the passage extends has essentially plane parallel surfaces.

19. A claw according to claim 1, wherein the inlet member comprises a tubular element extending from the housing.

* * * * *